A. WEBSTER.
Hold-Back
No. 13,604. Patented Sept. 25, 1855
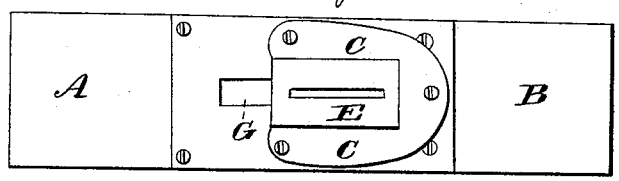
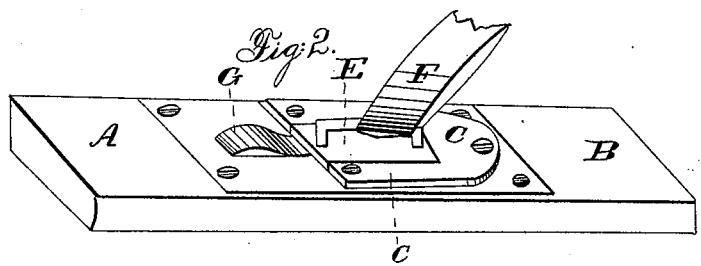
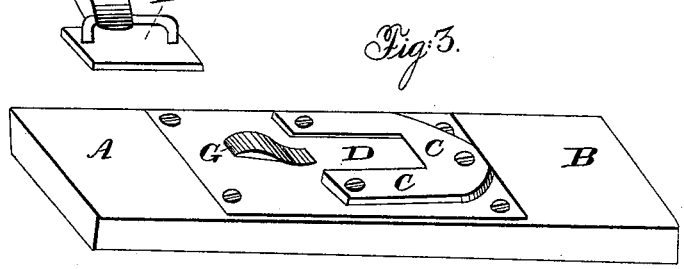

UNITED STATES PATENT OFFICE.

ALONZO WEBSTER, OF MONTPELIER, VERMONT.

HOLDBACK FOR CARRIAGES.

Specification of Letters Patent No. 13,604, dated September 25, 1855.

*To all whom it may concern:*

Be it known that I, ALONZO WEBSTER, of Montpelier, in the county of Washington, in the State of Vermont, have invented a new and improved holdback to be used upon the shafts and tongues of carriages, adapted to prevent accidents and permit the free discharge of a horse from the carriage when detached from the whiffletree; and I hereby declare that the following is a full and exact description thereof, reference being had to the accompanying drawings and to the letters of reference marked thereon.

Of the said drawings Figure 1 at the bottom of the sheet, represents a top view of the portion of the shaft, having my holdbacks attached. Fig. 2 denotes a side view of the same with the harness attached. Fig. 3 represents the holdback when the dovetail slide is drawn out as is the case when the holdback is unhitched from the shaft.

In the drawings A, B, denotes the portion of the shaft having the holdbacks attached—A the forward portion and B the back portion toward the carriage.

C C denotes the portion of the holdback securely fastened upon the shaft, forming thereon the dovetail groove D.

E denotes a dovetail slide with a loop permanently attached for the reception of the holdback strap F.

G represents a spring fastened upon the shaft in front of the dovetail groove D.

When the holdback is hitched the dovetail slide is shoved into the groove and is there held from working forward by the spring G, but when the horse is unhitched from the whiffletree, the spring will give under the forward pressure, and let the horse free from the carriage. The same result would follow provided these holdbacks were fastened upon each side of the forward end of a tongue to a carriage, adapted for two horses, when unhitched from the whiffletree, the forward movement of the horses would immediately detach them from the tongue.

This invention is designed to be used on a carriage for one or more horses, and to be placed upon the top or under the shaft, as may be deemed the most convenient.

This method is regarded as more convenient than those now in use, and more safe, as it is self acting when you wish to discharge a horse from the shafts, or disconnect from the tongue. It is adapted to the use of an improved whiffletree, patented for H. and A. Webster on the 29th of May last.

What I claim is,

The dovetail groove D, the dovetail slide E, and the spring G, the whole being applied, and made to operate substantially in the manner and for the purpose specified.

ALONZO WEBSTER.

Witnesses:
LAURA A. WEBSTER,
C. W. BANCROFT.